United States Patent [19]

Steeby et al.

[11] Patent Number: 5,323,669

[45] Date of Patent: Jun. 28, 1994

[54] FAULT TOLERANT METHOD OF TRANSMISSION GEAR SELECTION

[75] Inventors: Jon Steeby, Schoolcraft; Steven A. Schroeder, Battle Creek, both of Mich.

[73] Assignee: Eaton Corporation, Cleveland, Ohio

[21] Appl. No.: 968,200

[22] Filed: Oct. 29, 1992

[51] Int. Cl.⁵ .............................................. B60K 41/06
[52] U.S. Cl. ................................................... 74/336 R
[58] Field of Search ........................ 74/336 R, 866; 192/0.092, 3.51

[56] References Cited

U.S. PATENT DOCUMENTS

| | | | |
|---|---|---|---|
| 4,507,736 | 3/1985 | Klatt | 74/336 R |
| 4,648,290 | 3/1987 | Dunkley et al. | 74/866 |
| 4,690,008 | 9/1987 | Klatt | 74/336 R |
| 4,849,899 | 7/1989 | Cote et al. | |
| 4,873,881 | 10/1989 | Edelen et al. | 74/866 X |
| 4,922,425 | 5/1990 | Mack et al. | |
| 4,937,749 | 6/1990 | Dunkley et al. | 74/866 X |
| 5,042,327 | 8/1991 | Stainton | 74/336 R |
| 5,109,721 | 5/1992 | Boardman et al. | |
| 5,148,722 | 9/1992 | Mehta | 74/866 |

FOREIGN PATENT DOCUMENTS 0106752  6/1984  Japan ............................. 74/336 R Primary Examiner—Rodney H. Bonck
Attorney, Agent, or Firm—Brooks & Kushman

[57] ABSTRACT

A fault tolerant method of gear selection which initiates a gear selection search in response to a gear upshift or downshift requirement in an attempt to locate a gear that, if used, would result in an engine speed between both upper and lower engine speed limits. The search progresses from the lowest to the highest gear in the case of an upshift requirement and from the highest to the lowest gear in the case of a downshift requirement.

8 Claims, 3 Drawing Sheets

FAULT TOLERANT METHOD OF TRANSMISSION GEAR SELECTION

TECHNICAL FIELD

This invention relates to methods of controlling transmissions and more particularly to a fault tolerant method of selecting gear shifts for an automated mechanical transmission.

BACKGROUND ART

Automated mechanical transmissions are well known in the art and fault tolerant methods of gear selection for such transmissions have been proposed. See for example, U.S. Pat. Nos. 5,109,721, 4,922,425 and 4,849,899 all assigned to the assignee of the present invention, the disclosures of which are all hereby incorporated by reference. While such methods have been successful, the approach to fault tolerance has been to either maintain the transmission in the existing gear, limit gear selection to the auxiliary range section of transmission gears or modify the control algorithm to accommodate loss of a sensor.

SUMMARY OF THE INVENTION

In accordance with the present invention an improved fault tolerant method of automated gear selection is provided in which an automated gear shift request initiates a gear selection search through a table of gears in an attempt to locate a usable gear from those presently available for use. In the case of an upshift request the search is conducted in ascending order from the lowest to highest gear and in the case of a downshift request the search is conducted in descending order from the highest to the lowest gear. In either case, the engine speed that would result from using the gear under consideration is tested to see if it falls between predetermined useable upper and lower engine speed values. The requirement that an upshift result in an engine speed that is greater than the predetermined minimum and that a downshift result in an engine speed which is less than a predetermined maximum, causes an automatic modification of the existing shift point in the event of loss of a gear. By modifying the shift point when it becomes necessary to skip a gear, extreme high or low engine speeds with attendant potential engine damage is avoided.

BRIEF DESCRIPTION OF THE DRAWINGS

A more complete understanding of the present invention may be had from the following detailed description which should be read in conjunction with the drawings in which.

DETAILED DESCRIPTION OF PREFERRED EMBODIMENT

Figure 1:
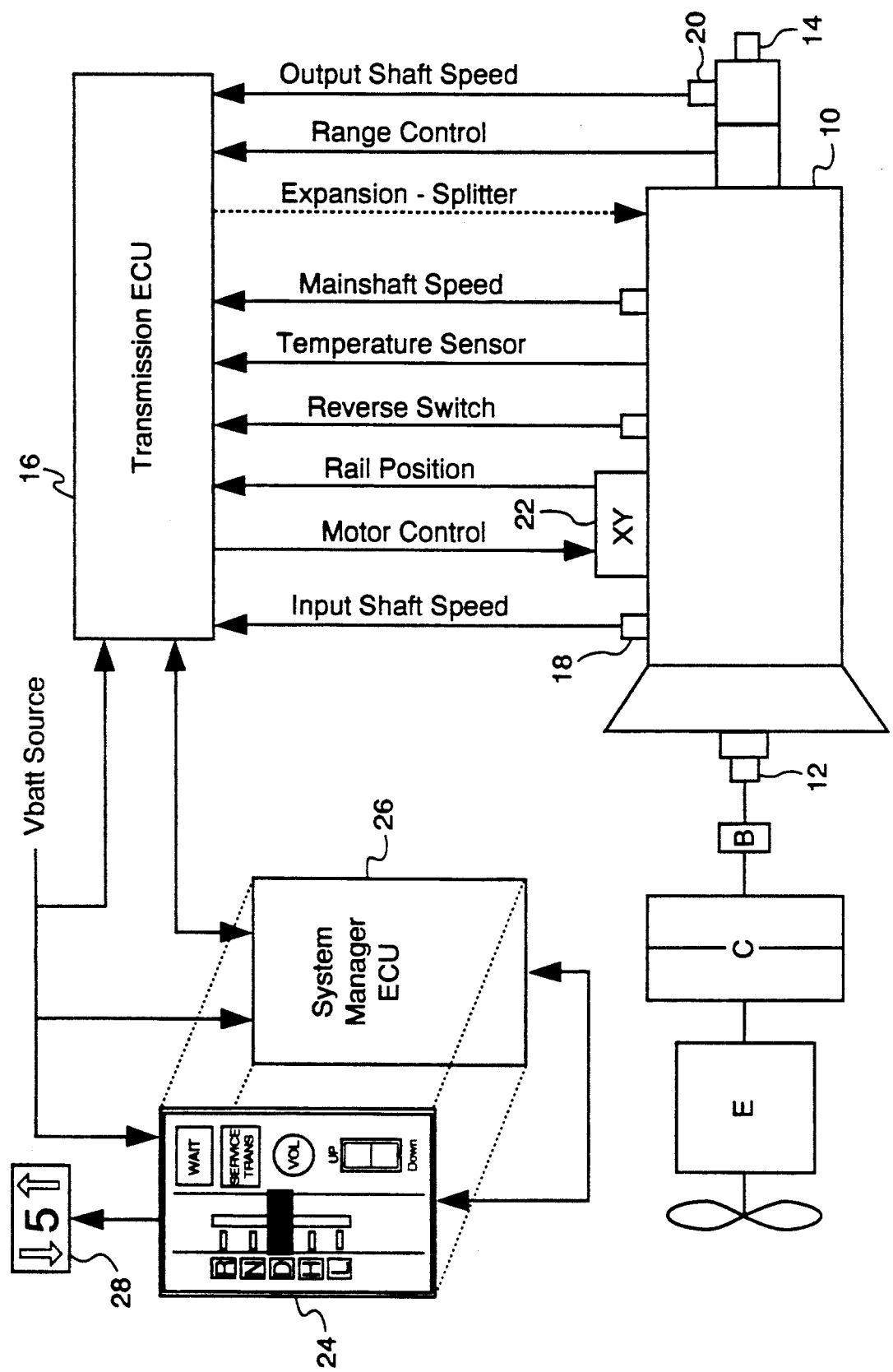
FIG. 1 is a block diagram of a transmission system of the type that would benefit from the gear shift method of the present invention.

Referring now to the drawings and initially to FIG. 1, a partially automated range type compound transmission 10 of known configuration is disclosed. Transmission 10 comprises a multiple ratio main transmission section connected in series with a multiple ratio auxiliary section. Transmission 10 includes an input shaft 12 driven by a prime mover such as a diesel engine E through a normally engaged, but selectively disengagable, friction master clutch C. The master clutch C has an driving portion connected to the engine crankshaft and a driven portion fixed to the transmission input shaft 12. The engine is fuel controlled by a manually operable throttle device (not shown) and the master clutch is manually controlled by a clutch pedal or the like (not shown). An input shaft brake B, operated by overtravel depression of the clutch pedal, is preferably provided to permit quicker upshifting as is well known in the art. The transmission output shaft 14 is driven through the gearing of the transmission 10 at a speed which is reduced in relation to the transmission input shaft 12 by the ratio of the current gear selected.

Shifting of the gears of the transmission 10 is under the control of an electronic control unit or ECU 16, preferably microprocessor based, which receives inputs from a number of sensors as indicated, including an input shaft sensor 18 and an output shaft sensor 20. The ECU 16 receives inputs from and provides control signals to an XY shifting mechanism 22 to effect gear shifts as described more fully in U.S. Pat. No. 4,873,881, assigned to the assignee of the present invention, and incorporated herein by reference. The ECU 16 also receives inputs from and provides control signal to a shift console and display unit generally designated 24, either directly or as shown in FIG. 1, over a data link coupling the ECU 16 to a system manager ECU 26 which directly interfaces with the console and display unit 24. The unit 24 provides status information to the driver and also includes Up and Down buttons for manually shifting the transmission when the console is in the Hold position H. A driver display module 28 may be provided to display current gear and may include arrows showing whether the shift was an upshift or a downshift. Further details regarding the transmission 10 and the system for controlling such a transmission may be obtained from the aforementioned U.S. Pat. No. 5,109,721 as well as U.S. Pat. No. 5,050,079, and the patents referenced and discussed therein, the disclosures of which are hereby incorporated by reference.

Figure 2A:
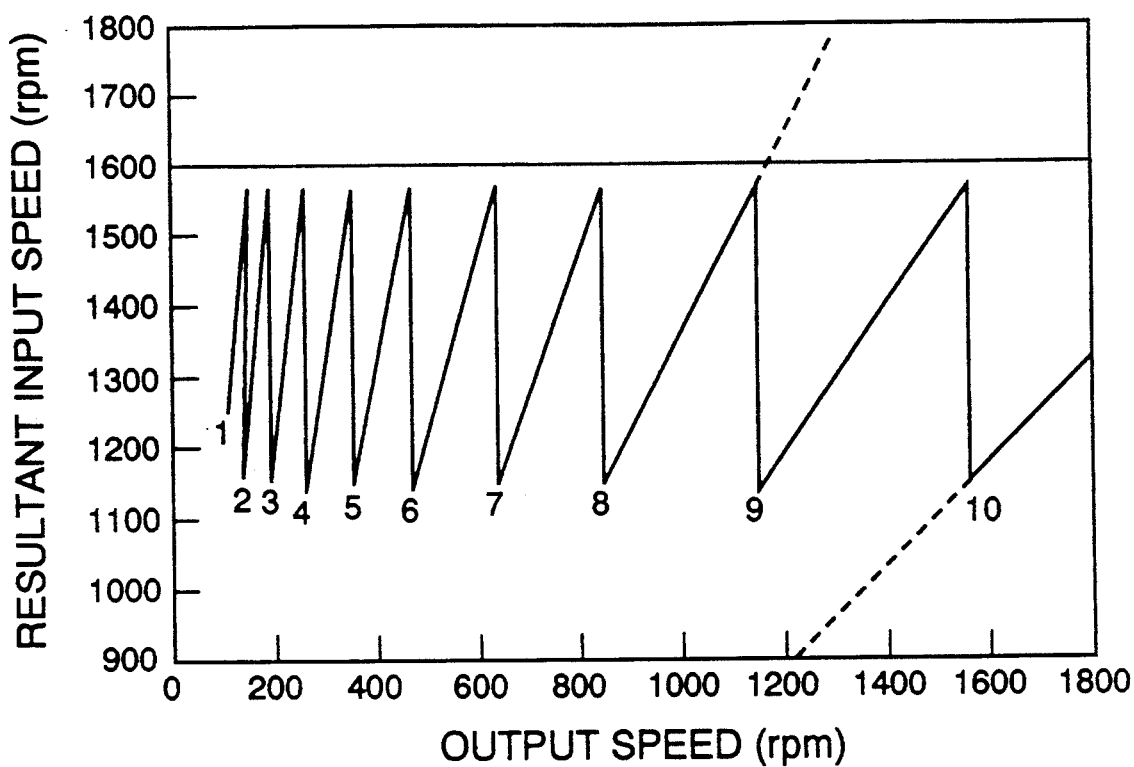
FIGS. 2a and 2b are plots of transmission input vs output speed of a typical transmission of the type shown in FIG. 1.
Figure 2B:
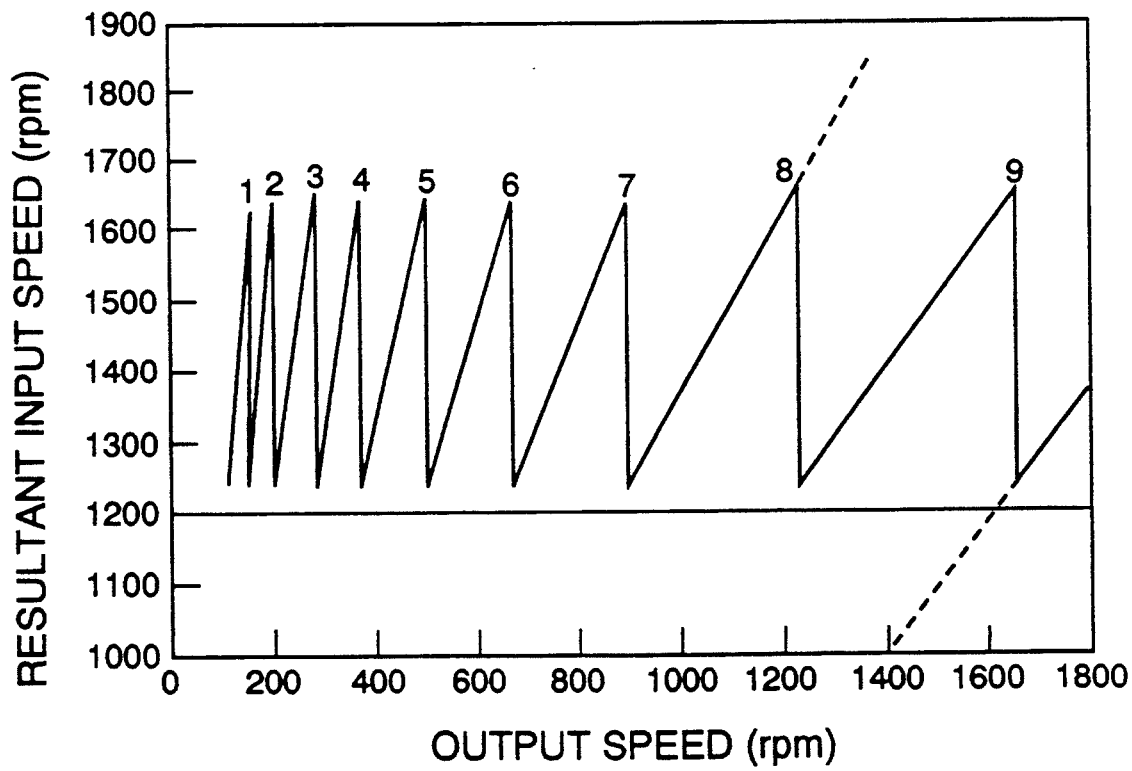

Referring now to FIGS. 2a and 2b, plots of transmission output speed as a function of input speed are shown for a 10 speed transmission of the type represented in FIG. 1. In FIG. 2a an automatic upshift to the next gear is assumed to occur when the input shaft speed (engine speed) reaches 1600 rpm. In FIG. 2b an automatic downshift is assumed to occur when the engine speed drops to 1200 rpm. The engine speeds referenced here are by way of example only and may be different for other transmission configurations. As shown in FIGS. 2a and 2b the transmission output shaft speed ideally does not change in shifting from the present gear to the next higher or lower gear.

The slope of the lines in FIGS. 2a and 2b correspond to the ratio between input and output shaft speed produced by the indicated gear as set forth in Table 1.

| Speed | Ratios | % Step |
| --- | --- | --- |
| 10th | .74 | |
| | | 34 |
| 9th | 1.00 | |
| | | 36 |
| 8th | 1.36 | |

-continued

| Speed | Ratios | % Step |
|-------|--------|--------|
|       |        | 35     |
| 7th   | 1.83   |        |
|       |        | 34     |
| 6th   | 2.46   |        |
|       |        | 35     |
| 5th   | 3.32   |        |
|       |        | 34     |
| 4th   | 4.46   |        |
|       |        | 36     |
| 3rd   | 6.07   |        |
|       |        | 35     |
| 2nd   | 8.18   |        |
|       |        | 34     |
| 1st   | 10.99  |        |

The dotted line extensions of the 8th and 10th gear slopes show the shift point modification which is needed when the 9th gear is unavailable due to a malfunction or fault. If the transmission is merely shifted to 10th gear when the engine speed reaches 1600 rpm in 8th gear, the resulting engine speed would drop immediately to less than 900 rpm. This is undesirable because of the inability to synchronize the new ratio. However, if, as in the prior art, the only requirement for upshift is that the resulting engine speed be less than 1600, 10th gear would qualify but would be selected much too early. By adding the further requirement that resulting engine speed must be above a predetermined minimum such as 900 rpm, 10th gear will not be selected as a usable gear until an engine speed of approximately 1646 rpm in 8th gear occurs. Thus, a shift point modification from approximately 1600 rpm to approximately 1640 rpm automatically occurs by introducing the minimum engine speed requirement in the automatic upshift criteria. Similarly, where 9th gear is unavailable an automatic downshift from 10th gear to 8th gear should occur only if the resultant engine speed is not only greater than the 1200 rpm minimum but also less than a predetermined maximum of for example 1850 rpm. This additional requirement automatically modifies the point at which a downshift from 10th to 8th gear is permitted, in the event of the unavailability of 9th gear from 1200 rpm to about 1011 rpm. In general in order for an automatic shift to occur, the resultant input shaft speed i.e. the input shaft speed of the next available gear must be between upper and lower limits of, for example, 900 rpm and 1850 rpm for a transmission having the gear ratios set forth in Table 1 assuming typical engine characteristics. The calculation for determining the rpm shift point is as follows:

$$IS_{nextavailablegear} = IS_{currentgear} \left( \frac{Ratio_{nextavailablegear}}{Ratio_{currentgear}} \right)$$

The up and down shift points are thus modified based on the available gears of the transmission. In other words, the shift points are extended or opened up until the next available gear is selected.

Figure 3:
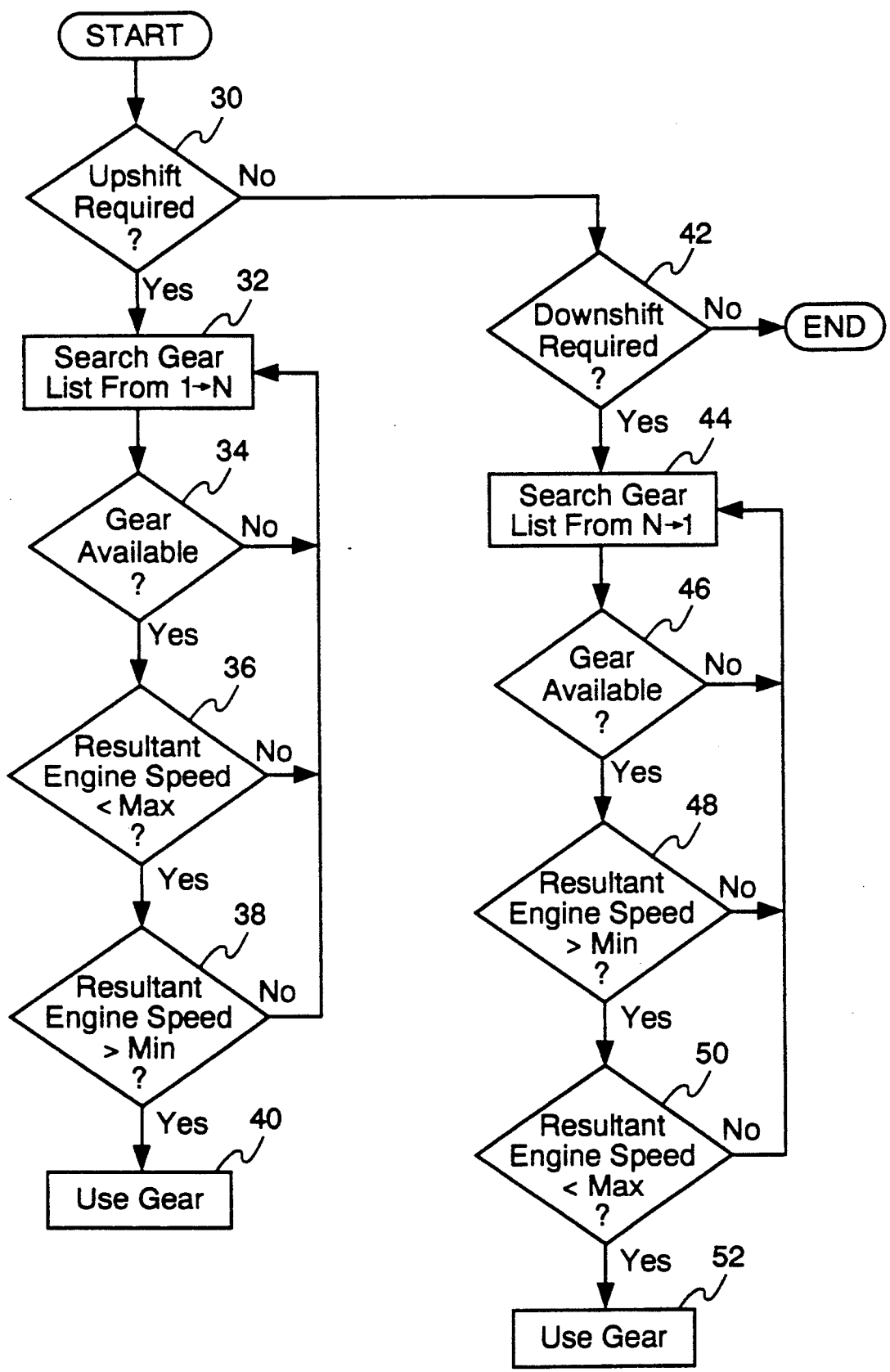
FIG. 3 is a flow chart useful in understanding the gear shift method of the present invention.

Referring now to FIG. 3, the gear shift selection method of the present invention is depicted in a computer flow chart. As indicated in the decision block 30, if an upshift from the present gear ratio is required i.e. the transmission input shaft speed (engine speed) as detected by the transmission input shaft sensor 18 is greater than 1600 rpm, then a search, indicated at 32, for a useable gear is initiated by examining a list or table of gears beginning with the first gear of the transmission and ending with the last gear "N" of the transmission. As indicated at decision block 34, the first gear located during the search which is available for use, that is to say no fault exists that would prevent an upshift to the gear located, is tested against the criteria set out in decision blocks 36 and 38. The list of gears in the transmission may be contained in a lookup table with their associated gear ratios and may be appropriately identified as being available for use or not available for use based on whether a malfunction of a gear or sensor would make use of the gear unacceptable. Alternatively, the system may respond to a fault condition by entering a restricted mode of operation where the table is restricted to only those gears that are available for use i.e. the existing table would be replaced with a new table in the event of a failure so that only available gears are searched. In this case the decision block 34 would be unnecessary.

As indicated above, each available gear located during th automatic upshift search is tested against the criteria of decision block 36 to determine if the engine speed that would result from using the gear located is less than or equal to a predetermined maximum such as for example 1570 rpm. If so, then the gear ratio is further tested against the criteria set out in decision block 38, otherwise the search is continued until the next available gear is located. If the engine speed that would result from using the gear located is not only less that the predetermined maximum as required by block 36, but is also greater than a predetermined minimum such as 900 rpm, then the shift to the selected gear is made as indicated at 40, otherwise the search is continued until a suitable gear is selected.

Referring again to decision block 30, if an upshift is not required a determination of whether a downshift is required is made at decision block 42. If no downshift is required the routine is exited. If a downshift is required i.e. the engine speed (transmission input shaft speed) as detected by the input shaft speed sensor 18 drops below a predetermined minimum value such as, for example, 1200 rpm, then a search is initiated, as indicated at 44,46, through the list of gears in descending order from N to 1, to locate the next available gear. The engine speed that would result from using the next available gear is calculated by multiplying the existing output shaft speed by the gear ratio of the gear located. If the engine speed is greater than the predetermined minimum speed of 900 rpm and less than the predetermined maximum speed of 1855 rpm, as required by the decision blocks 48 and 50, then a shift to the located gear is made as indicated at 52, otherwise the next available gear is examined.

Accordingly, it may be seen that a transmission gear shifting method which is tolerant of fault conditions is provided. It will be understood that the above description of the preferred embodiment is by way of example only and that various modifications are possible without departing from the spirit and the scope of the present invention as hereinafter claimed.

What is claimed is:

1. A computer implemented method of shifting gears in a transmission, which is drivingly coupled to an engine, in response to a change gear request, comprising the steps of:

a. searching a table of gears, in a predetermined order as a function of the direction of the gear shift requested to locate the next gear available for use, b. determining whether the engine output speed, which would result from using the gear located in step a. is both less than a predetermined maximum engine output speed and greater than a predetermined minimum engine output speed, c. continuing the search of step a. and the evaluation of step b. unless the gear located in step a. meets the criteria of step b. in which event performing a shift from the present gear to the gear located.

2. A computer implemented method of shifting gears in a transmission, which is drivingly coupled to an engine, in response to a change gear request, comprising the steps of:

a. searching a table of gears, in a predetermined order as a function of the direction of the gear shift requested to locate the next gear available for use, b. calculating the engine output speed that would result from using the gear located in step a.

c. determining whether the engine output speed calculated in step b. is both less than a predetermined maximum engine output speed and greater than a predetermined minimum engine output speed, d. continuing the search of step a. and the evaluation of step b. unless the gear located in step a. meets the criteria of step b. in which event performing a shift from the present gear to the gear located.

3. The method defined in claim 2 wherein the engine speed is calculated by multiplying the current engine speed by the ratio of the net available gear divided by the ratio of the current gear.

4. A computer implemented method of selecting a new transmission gear in response to a gear shift request, comprising the steps of;

a. searching a transmission gear table in a predetermined order as a function of the direction of gear shift requested to locate the next gear available for use, b. determining whether the engine speed, which would result from using the gear located in step a. is both less than a predetermined maximum engine speed and greater than a predetermined minimum engine speed, c. using the gear located in step a. if the criteria of step b. is met, otherwise continuing the search of step a. and the evaluation of step b. until an available gear is located.

5. A computer implemented method of shifting gears in a transmission, which is drivingly coupled to an engine, in response to a upshift gear change request comprising the steps of:

a. searching a gear table, in ascending order from the lowest to the highest gear to locate the next available gear, b. determining whether the engine speed, which would result from using the gear located in step a. is both less than a predetermined maximum engine speed and greater than a predetermined minimum engine speed, c. using the gear located in step a. if the criteria of step b. is met, otherwise continuing the search of step a. and the evaluation of step b. until an available gear is located.

6. A computer implemented method of shifting gears in a transmission system in response to a change gear request, said system including a transmission comprising a plurality of gears, said transmission being drivingly coupled to a fuel controlled engine, a control unit effective to receive input signals from a plurality of sensors indicative of the status of the transmission system and to process same in accordance with logic rules and to issue command output signals to a plurality of system actuators, said method characterized by the steps of:

a. searching a table of gears in a predetermined order as a function of the direction of gear shift requested to locate the next gear available for use, b. determining whether the engine speed, which would result from using the gear located in step a. is both less than a predetermined maximum engine speed and greater than a predetermined minimum engine speed, c. shifting to the gear located in step a. if the criteria of step b. is met, otherwise continuing the search of step a. and the evaluation of step b. until the next usable gear is located.

7. A computer implemented method of shifting gears in a transmission system in response to a change gear request, said system including a transmission comprising a plurality of gears, said transmission being drivingly coupled to a fuel controlled engine, a control unit effective to receive input signals from a plurality of sensors indicative of the status of the transmission system and to process same in accordance with logic rules and to issue command output signals to a plurality of system actuators said method characterized by the steps of:

a. sensing for the presence of conditions indicative of a system fault;

b. responding to sensing the presence of said conditions by entering a restricted gear mode of operation of the system during which less than the full complement of gears are available for use; said restricted gear mode being characterized by a new gear table which is populated by the gears available during the restricted gear mode of operation;

c. searching said new gear table in response to a gear shift request, in a predetermined order as a function of the direction of gear shift requested to locate the next gear available for use, d. determining whether the engine speed which would result from using the gear located in step c. is both less than a predetermined maximum engine speed and greater than a predetermined minimum engine speed, e. shifting to the gear located in step c. if the criteria of step d. is met, otherwise continuing the search of step c. and the evaluation of step b. until the next usable gear is located.

8. The method defined in claim 7 wherein the engine speed resulting from using the gear selected in step (c) is calculated by multiplying the current engine speed by the ratio of the next available gear divided by the ratio of the current gear.

* * * * *